No. 679,311. Patented July 30, 1901.
J. P. HANSEN.
FOOD COOLER.
(Application filed Jan. 21, 1901.)
(No Model.) 2 Sheets—Sheet 1.

WITNESSES:
John P. Brauch.
S. Rovegno.

INVENTOR.
James P. Hansen
BY
Lincoln Sonntag
ATTORNEY.

No. 679,311. Patented July 30, 1901.
J. P. HANSEN.
FOOD COOLER.
(Application filed Jan. 21, 1901.)
(No Model.) 2 Sheets—Sheet 2.

WITNESSES: John P. Branch
S. Rovegno.

INVENTOR. James P. Hansen
BY Lincoln Sounty
ATTORNEY.

UNITED STATES PATENT OFFICE.

JAMES P. HANSEN, OF SAN FRANCISCO, CALIFORNIA.

FOOD-COOLER.

SPECIFICATION forming part of Letters Patent No. 679,311, dated July 30, 1901.

Application filed January 21, 1901. Serial No. 44,093. (No model.)

*To all whom it may concern:*

Be it known that I, JAMES P. HANSEN, of the city and county of San Francisco, State of California, have invented a new and useful Food-Cooler, of which the following is a full and exact description.

My invention relates to improvements in food-coolers.

The object of the said invention is to furnish a light, plain, and inexpensive food-cooler by which articles of food will become and remain cool in hot climates through the constant saturation with cold water of absorbent material surrounding such articles.

Figure 1:
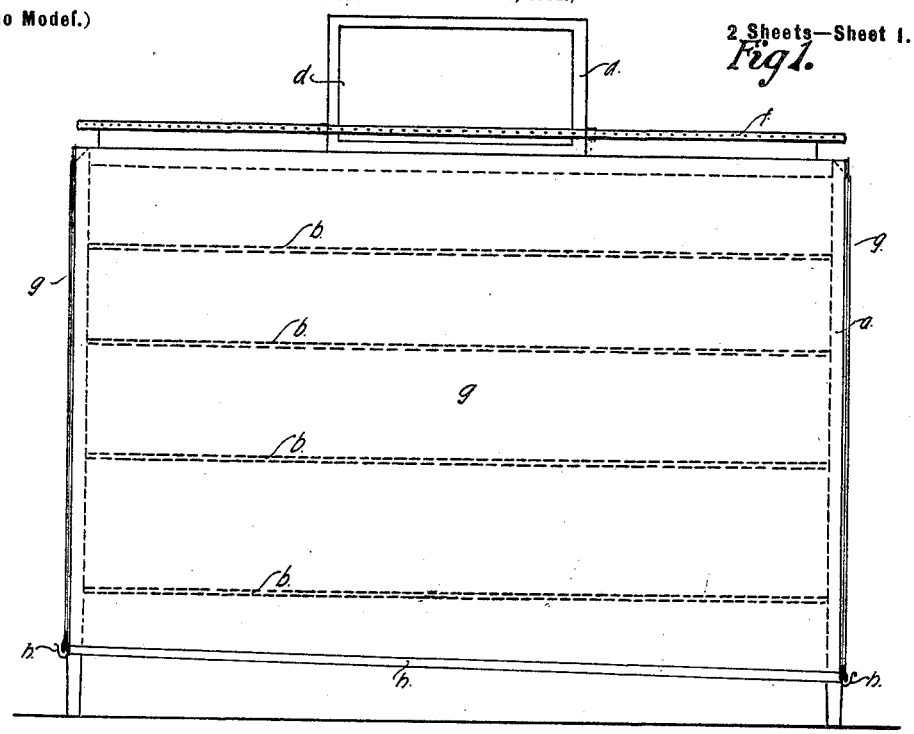
Figure 2:
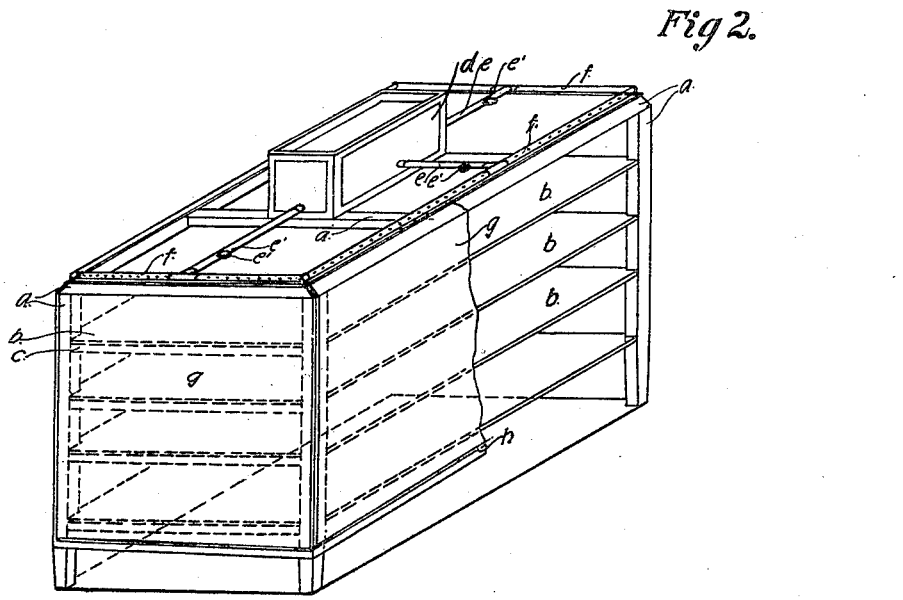
Figure 3:
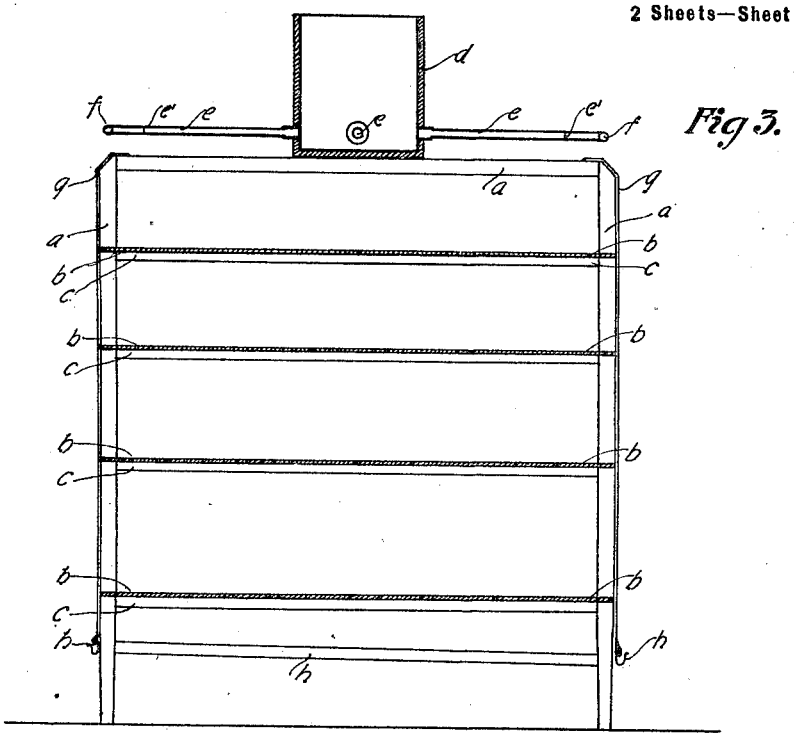
Figure 4:
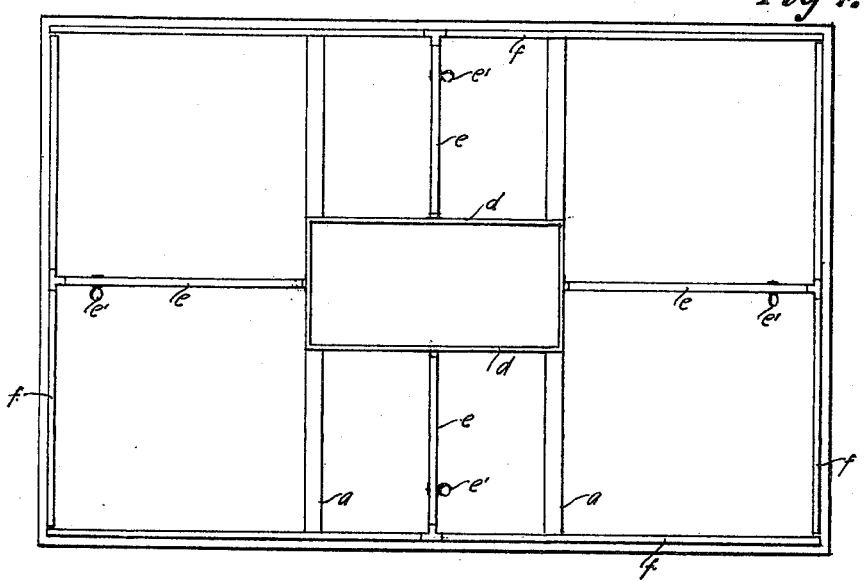

As to the drawings, Figure 1 is a longitudinal section of the apparatus, showing perforated pipe and tank, shelves, curtains, and gutter. Fig. 2 is a perspective view of the same. Fig. 3 is a transverse section showing tank, conducting-pipes, shelves, curtains, and gutters. Fig. 4 is a plan view of the top of the apparatus, showing pipes and tank.

In the figures as shown in the accompanying drawings, references thereto being had, $d$ represents a tank resting on the cross-pieces $a$, which pass over the inclosed top of the apparatus and which may be constructed of wood or metal.

A perforated pipe is shown at $f$.

$a$ represents uprights or posts to sustain the structure. Shelves $b$ are secured to the uprights for the purpose of sustaining articles of food as may be placed upon them.

$e$ represents the pipes for conducting water from the tank to the perforated pipes, capped at each end and placed at right angles to one another and which allow water flowing from the holes therein to saturate the curtains of bagging or other absorbent material $g$, depending from the upper cross-pieces binding the posts, (shown at $a$ in Fig. 2,) thereby cooling the interior of the apparatus during evaporation.

$c$ represents the cross-pieces for binding and strengthening the frame of the apparatus.

$h$ represents the gutter, secured to the frame beneath the lower end of each curtain for carrying off the water dripping from the curtains while the device is in operation. Cocks for turning on or shutting off the supply of water for wetting the curtains are shown at $e'$, allowing the use of one or more of the four curtains, as may be desired. A pan may be placed under the apparatus for receiving the water flowing from the gutters, if desired.

I raise the curtains by means of cords fastened at the top of the apparatus and passing down under the lower end of such curtains and thence upward through pulleys secured to the frame.

The particular advantages of my apparatus to which I call attention are the ease with which articles may be placed on the shelves and especially removed therefrom from any of its sides, the novel use of curtains serving at once as retainers of water for the purpose of cooling and as a protection to the contents of the apparatus from insects, dust, and other detrimental objects, the lightness of the apparatus, and the simplicity of its construction.

Having described my invention, what I claim as new, and desire to secure by Letters Patent, is—

1. In an apparatus for cooling food the combination of a frame with open sides having shelving attached to the interior thereof and supporting a tank, a pipe leading from each side thereof and centrally connected with a perforated pipe capped at each end, means for controlling the flow of water through such pipes, a curtain of bagging or other absorbent material secured only to the upper cross-piece of each side of the frame and depending loosely therefrom, for carrying off the water dripping therefrom substantially as and for the purpose herein described.

2. In an apparatus for cooling food the combination of a frame with open sides, and provided with shelves, supporting a tank connected with separate and perforated capped pipes, disconnected curtains of bagging or other absorbent material depending loosely from the upper cross-pieces of said frame and gutters arranged under the lower ends thereof to receive water dripping therefrom substantially as and for the purpose described.

3. In an apparatus for cooling food the combination of a frame with open sides having shelves attached to the interior thereof supporting a tank connected with separate and longitudinally-perforated pipes capped at each end, disconnected curtains of bagging or other absorbent material depending loosely from the upper cross-pieces of said frame, means for raising and lowering said curtains and for carrying off the water dripping therefrom, substantially as and for the purpose described.

4. In an apparatus for cooling food the combination of a frame with open sides and shelves secured to the interior thereof, a tank resting thereon, pipes leading therefrom and centrally connected with pipes having longitudinal perforations and capped at each end, means for controlling the flow of water through such pipes for saturating disconnected curtains of bagging or other absorbent material depending from the upper portion of said frame, means for raising and lowering said curtains and for carrying off the water dripping therefrom substantially as and for the purpose described.

In testimony whereof I affix my signature in presence of two witnesses.

JAMES P. HANSEN.

Witnesses:
S. ROVEGNO,
JOHN BRANCH.